Figure 1:
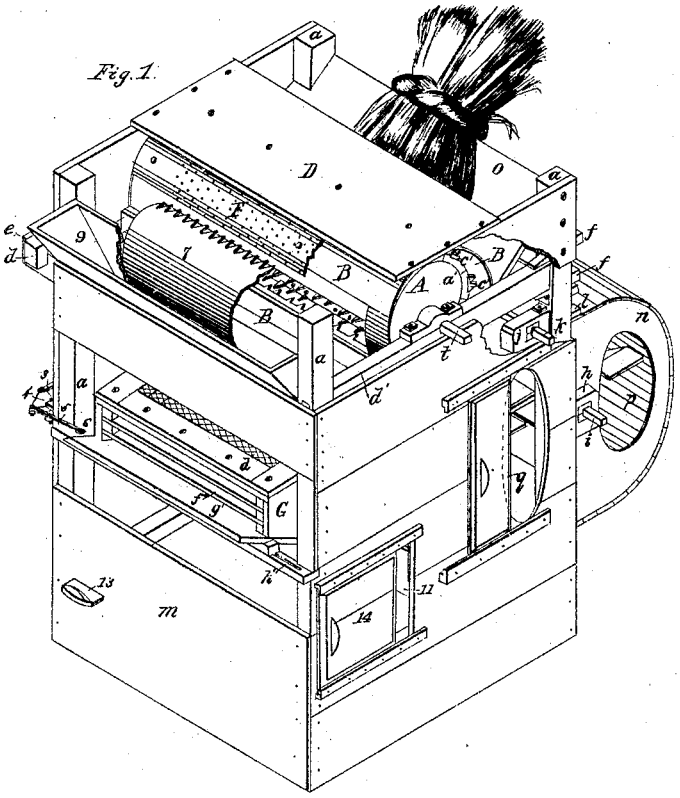
Figure 3:
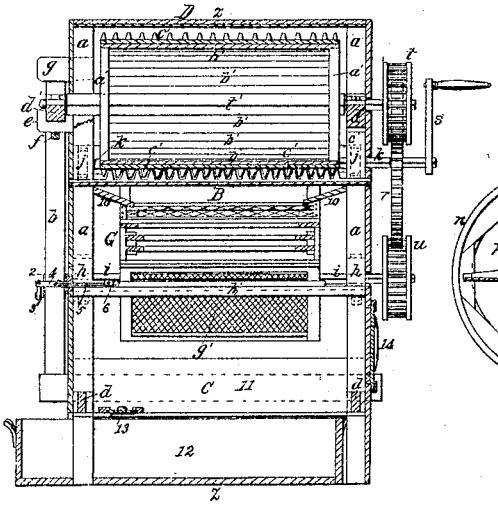
Figure 2:
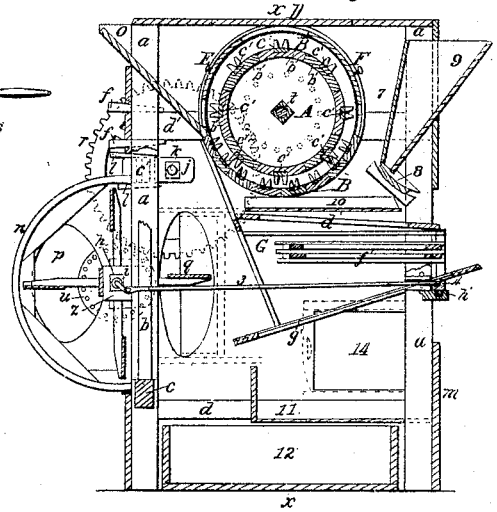

3752X

A. DOUGLASS.

MACHINE FOR THRESHING GRAIN, &c.

Patented Sept. 18, 1823.

MISSING PAGE TEMPORARY NOTICE

PATENT # 3752X FOR ISSUE DATE 9-18-1823

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All text